United States Patent
Yarkosky et al.

(10) Patent No.: US 7,437,159 B1
(45) Date of Patent: Oct. 14, 2008

(54) METHOD AND SYSTEM FOR OVERCOMING PILOT POLLUTION IN A WIRELESS COMMUNICATIONS NETWORK

(75) Inventors: Mark L. Yarkosky, Overland Park, KS (US); John Pope, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 383 days.

(21) Appl. No.: 09/886,633

(22) Filed: Jun. 21, 2001

(51) Int. Cl.
*H04Q 7/20* (2006.01)

(52) U.S. Cl. ............... 455/436; 455/562.1; 455/25; 455/13.4; 455/63.4; 455/77; 455/87; 455/88

(58) Field of Classification Search ......... 455/11.1, 455/7, 517, 446, 15, 562.1, 25, 13.4, 63.4, 455/77, 87, 88; 370/329, 315
See application file for complete search history.

(56) References Cited

U.S. PATENT DOCUMENTS

| | | | | |
|---|---|---|---|---|
| 5,455,962 | A * | 10/1995 | Kotzin | 455/422.1 |
| 5,999,816 | A * | 12/1999 | Tiedemann et al. | 455/437 |
| 6,128,512 | A * | 10/2000 | Trompower et al. | 455/561 |
| 6,317,600 | B1 * | 11/2001 | Salonaho et al. | 455/453 |
| 6,385,435 | B1 * | 5/2002 | Lee | 455/24 |
| 6,404,775 | B1 * | 6/2002 | Leslie et al. | 370/466 |
| 6,424,834 | B1 * | 7/2002 | Chang et al. | 455/436 |
| 6,459,895 | B1 * | 10/2002 | Hastings et al. | 455/424 |
| 6,518,920 | B2 * | 2/2003 | Proctor et al. | 342/367 |
| 6,690,916 | B1 * | 2/2004 | Yenerim | 455/11.1 |
| 7,054,662 | B2 * | 5/2006 | Judson | 455/562.1 |
| 2001/0046215 | A1 * | 11/2001 | Kim | 370/329 |
| 2002/0016170 | A1 * | 2/2002 | Sabat et al. | 455/436 |
| 2002/0047800 | A1 * | 4/2002 | Proctor et al. | 342/367 |

FOREIGN PATENT DOCUMENTS

WO     WO 0131804 A1 * 5/2001

* cited by examiner

*Primary Examiner*—David Q Nguyen

(57) ABSTRACT

An apparatus and method for overcoming pilot pollution in a wireless communications network. The apparatus boosts a preferred pilot signal within a geographical area that is suffering from pilot pollution. The boosted pilot signal is stronger than the pollution in this area, and causes mobile stations to lock onto the boosted pilot signal rather than the pollution. A directional receiving antenna on the apparatus receives the preferred pilot signal from a selected base station. After amplifying the preferred pilot signal, the apparatus transmits the boosted pilot signal from an antenna within the geographical area. In this manner, mobile stations lock communicate with the selected base station when within the geographical area rather than the base station responsible for the pilot pollution. This may result in fewer dropped calls from the network and fewer inappropriate hand-offs.

9 Claims, 8 Drawing Sheets

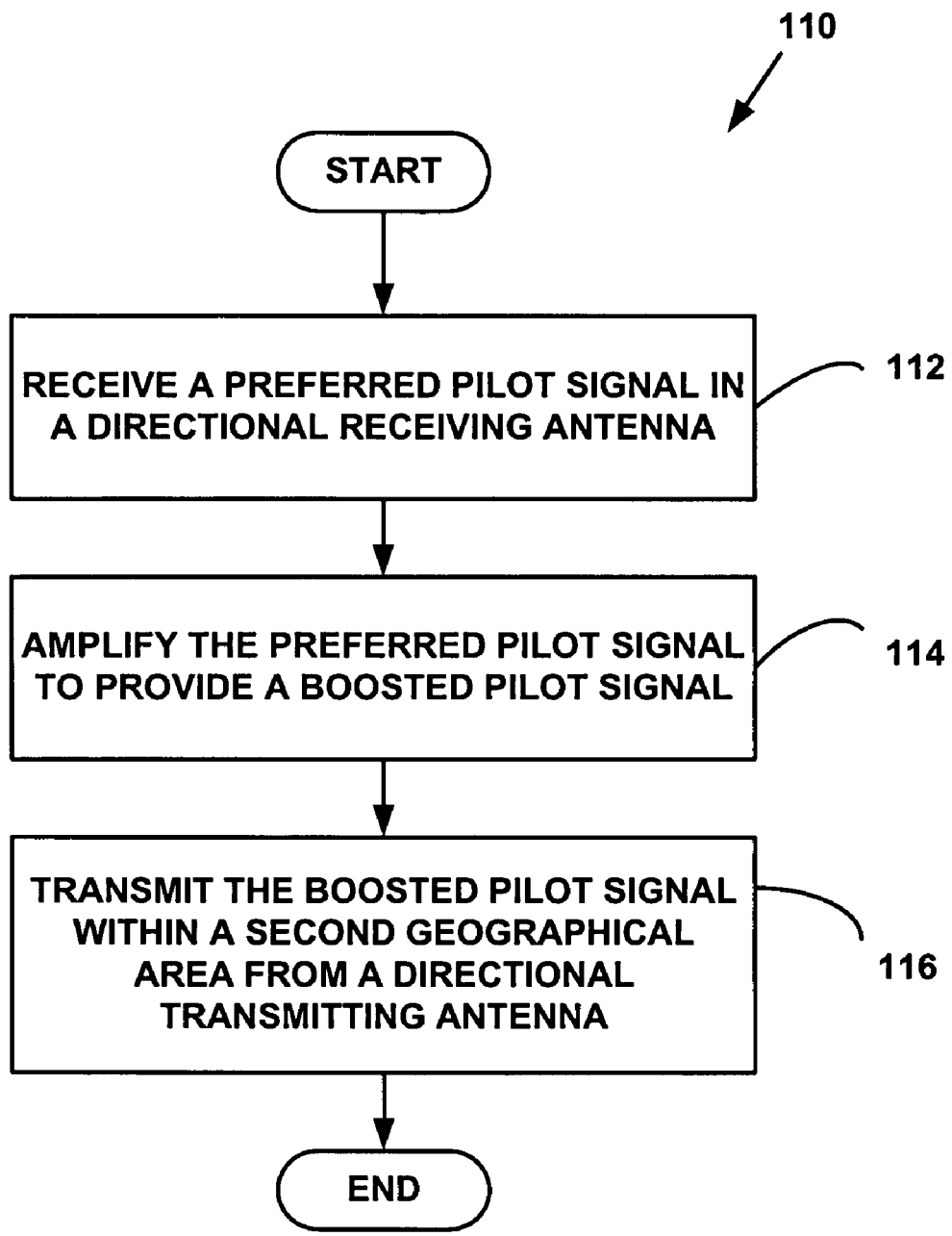

METHOD AND SYSTEM FOR OVERCOMING PILOT POLLUTION IN A WIRELESS COMMUNICATIONS NETWORK

FIELD OF INVENTION

The present invention relates to wireless communications networks. More specifically, it relates to a method for overcoming pilot pollution in a wireless network.

BACKGROUND OF THE INVENTION

Cellular wireless is an increasingly popular means of personal communication in the modern world. People are using cellular wireless networks for the exchange of voice and data over cellular telephones, Personal Digital Assistants ("PDAs"), cellular telephone modems, and other devices. In principle, a user can seek information over the Internet or call anyone over a Public Switched Telephone Network ("PSTN") from any place inside the coverage area of the cellular wireless network.

In a Code Division Multiple Access ("CDMA") wireless network, a mobile station, such as a cellular telephone, ordinarily retains in its memory a set of pseudo-random number offsets ("PN offsets") that identify base station sectors in the wireless communications network. Typically, the mobile station retains the PN offsets of the three nearest sectors and approximately twenty other PN offsets for the neighboring sectors to these three nearest sectors. The mobile station uses the PN offsets of the three nearest sectors to effect a handoff from one sector or cell of the network to another in its immediate vicinity. Once the network hands off the mobile station to one particular sector or cell, the mobile station obtains another three PN offsets for its new vicinity from the retained twenty numbers for the neighbors.

The mobile station determines which base stations include the three nearest sectors by comparing the strength of pilot signals from the base stations. In some geographical areas, however, a pilot signal from a sector of the nearest base station may be attenuated due to interference from buildings or other RF obstructions. In this case, the pilot signals from farther base stations may have similar signal strengths to the pilot signals of the nearest sectors. The result of this "pilot pollution" is that the mobile station is unable to distinguish the PN offsets of the nearest sectors from the farther sectors and so may attempt to lock onto a farther base station. This erroneous locking may result in the mobile station being dropped from the network as it does not have a sufficiently strong signal to transmit to the farther base station. Also, the mobile station may be unable to resolve ambiguities as to the nearest sectors because it receives the PN offsets that neighbor the farther base station and so perform a series of ineffective handoffs amongst the ambiguous PN offsets, which also results in a dropped call.

Previous solutions to the pilot pollution problem have included antenna down-tilts or base band attenuation at the base stations responsible for the pilot pollution. By directing the radiation pattern of the base station transmitter antenna downwards or curtailing the transmitter power, the pilot signals from the base station preferentially radiates within the base station's sectors and not out to distant geographical areas. In this manner, the strength of the pilot signals is weaker in the area that previously suffered the pilot pollution and so the pilot signals from the nearest sectors in the area are expected to dominate.

But the problem may persist due to diurnal changes in base station transmitter strength, known to those of ordinary skill in the art as "cell breathing." A property of CDMA systems is that power is shared among the mobile stations. As a cell loads up with mobile stations at particular times of the day, such as rush hour, the radio-frequency ("RF") interference rises and the cell size effectively shrinks. Thus a nearest sector pilot signal may lose strength as more mobile stations communicate with the nearest sector, and the pilot signal strength may become sufficiently low as to have similar strength to the pilot signal from a farther base station. Therefore, solving the problem with antenna tilt-down or attenuation may work for less loaded times in the day, but not for more loaded times.

It is therefore desirable to provide a method and apparatus for overcoming pilot pollution in an afflicted geographical area covered by the wireless communications system so that mobile stations in the geographical area preferentially lock onto a sector of the nearest base station.

SUMMARY OF THE INVENTION

One aspect of the invention is a method for overcoming pilot pollution in a geographical area within a cellular wireless system. The method includes receiving a preferred pilot signal in a directional receiving antenna within the geographical area. The preferred pilot signal is amplified to provide a boosted pilot signal, and the boosted pilot signal is transmitted within the geographical area.

Another aspect of the invention is an apparatus for overcoming pilot pollution in a geographical area within a cellular wireless system. The apparatus includes a directional receiving antenna for receiving a preferred pilot signal. The apparatus also includes a radio-frequency amplifier having an input and an output. The input accepts the preferred pilot signal from the directional receiving antenna and the output provides a boosted pilot signal. A transmission antenna in the apparatus accepts the boosted pilot signal from the output of the radio-frequency amplifier and transmits the boosted pilot signal within the geographical area.

A further aspect of the invention is a method for forcing a hand-off within a cellular wireless system on crossing a boundary from a first geographical area to a second geographical area. The method includes receiving a preferred pilot signal in a directional receiving antenna.

The preferred pilot signal is amplified to provide a boosted pilot signal, and the boosted pilot signal is transmitted from a directional transmitting antenna within the second geographical area.

Yet a further aspect of the invention is an apparatus for forcing a hand-off within a cellular wireless system on crossing a boundary from a first geographical area to a second geographical area. The apparatus includes a directional receiving antenna for receiving a preferred pilot signal. The apparatus also includes a radio-frequency amplifier having an input and an output. The input accepts the preferred pilot signal from the directional receiving antenna and the output provides a boosted pilot signal. A directional transmission antenna in the apparatus accepts the boosted pilot signal from the output of the radio-frequency amplifier and transmits the boosted pilot signal within the second geographical area.

The foregoing and other features and advantages of preferred embodiments of the present invention will be more readily apparent from the following detailed description, which proceeds with references to the accompanying drawings.

BRIEF DESCRIPTION OF THE DRAWINGS

Preferred embodiments of the present invention are described with reference to the following drawings, wherein:

FIG. 8 is a flow diagram illustrating a preferred method for forcing a hand-off within the cellular wireless system of FIG. 1 on crossing the boundary from the first geographical area to the second geographical area.

DETAILED DESCRIPTION OF PREFERRED EMBODIMENTS

Figure 1:
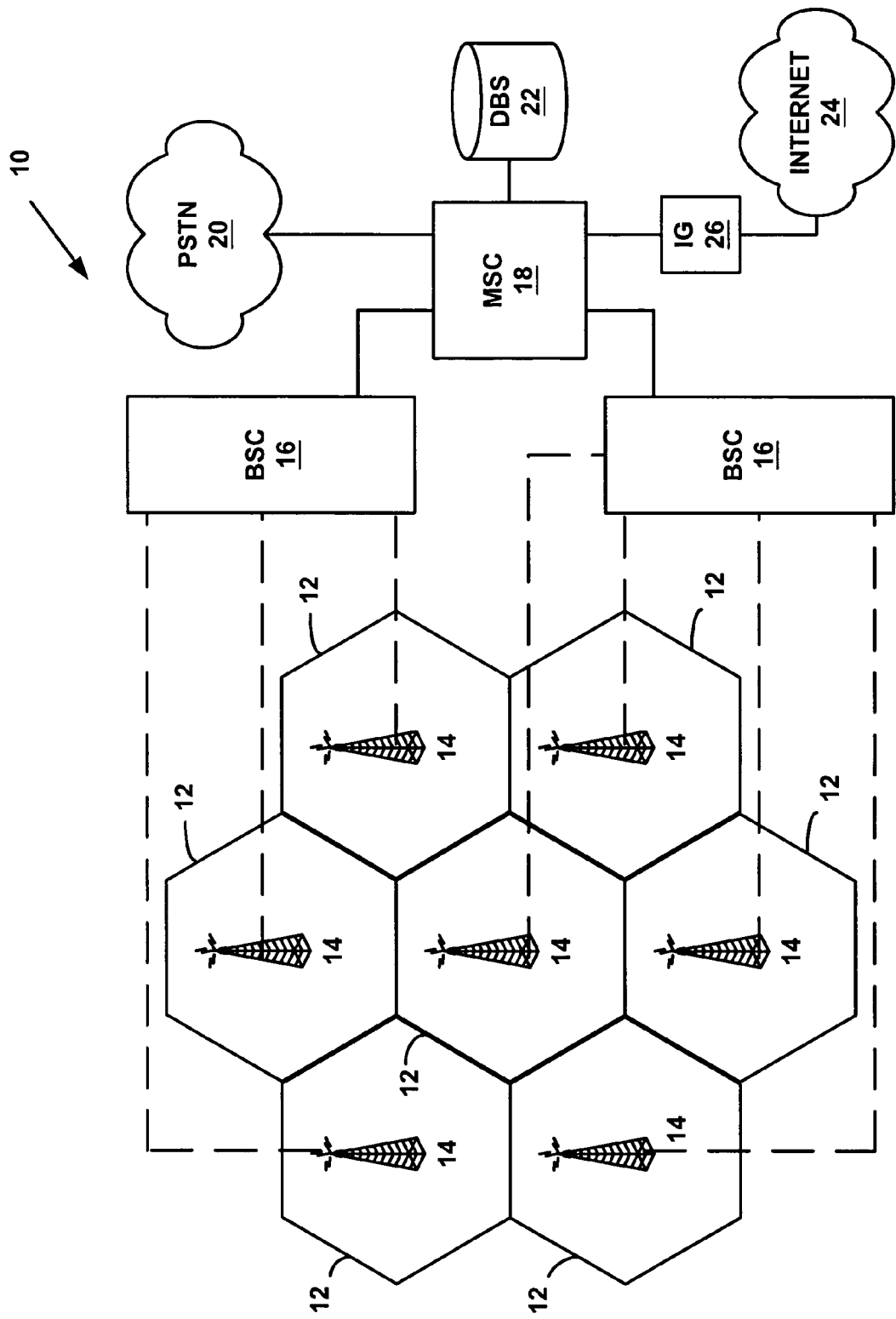
FIG. 1 is a block diagram illustrating components of an exemplary cellular wireless system.

FIG. 1 is a block diagram illustrating components of an exemplary cellular wireless system 10. The system includes multiple geographical regions, known as cells 12 by those of ordinary skill in the art, each of which has a base transceiver station 14, also referred to as a base station, usually at the center of each cell 12. The base stations 14 typically transmit and receive wireless communications to and from mobile stations (not shown). In TDMA systems, each base station 14 typically communicates on a group of frequencies, and each frequency may itself carry at least one multiplexed call. Each base station 14 in a CDMA system, by comparison, communicates over a spread spectrum of frequencies, and the spectrum may carry many multiplexed calls. In a preferred embodiment, the cellular wireless system 10 is a CDMA wireless system. Typical components for CDMA systems include those described in the TIA standard, ANSI/TIA/EIA-95-B-99, dated Feb. 3, 1999, which is incorporated herein by reference.

The base stations 14 connect to base station controllers 16 ("BSCs") that manage handing-off the mobile station when it moves from cell 12 to cell 12. The BSCs connect to a mobile services switching center 18 ("MSC") that manages calls and routes them between a public switched telephone network 20 ("PSTN") and the appropriate cell 12. The MSC 18 also maintains databases 22 ("DBS") that store customer and system information. The MSC's tasks include authenticating and registering mobile stations on the system 10, and processing account information for customers. Additionally, the MSC 18 typically connects to the Internet 24 through an Internet Gateway ("IG") 26 for transferring data between the mobile station and a remote host computer (not shown) that is globally accessible via the Internet 24. It should be understood, however, that the preferred embodiments are not restricted to the cellular wireless system 10 depicted in FIG. 1 and that other components and configurations may support the methods described herein.

Figure 2:
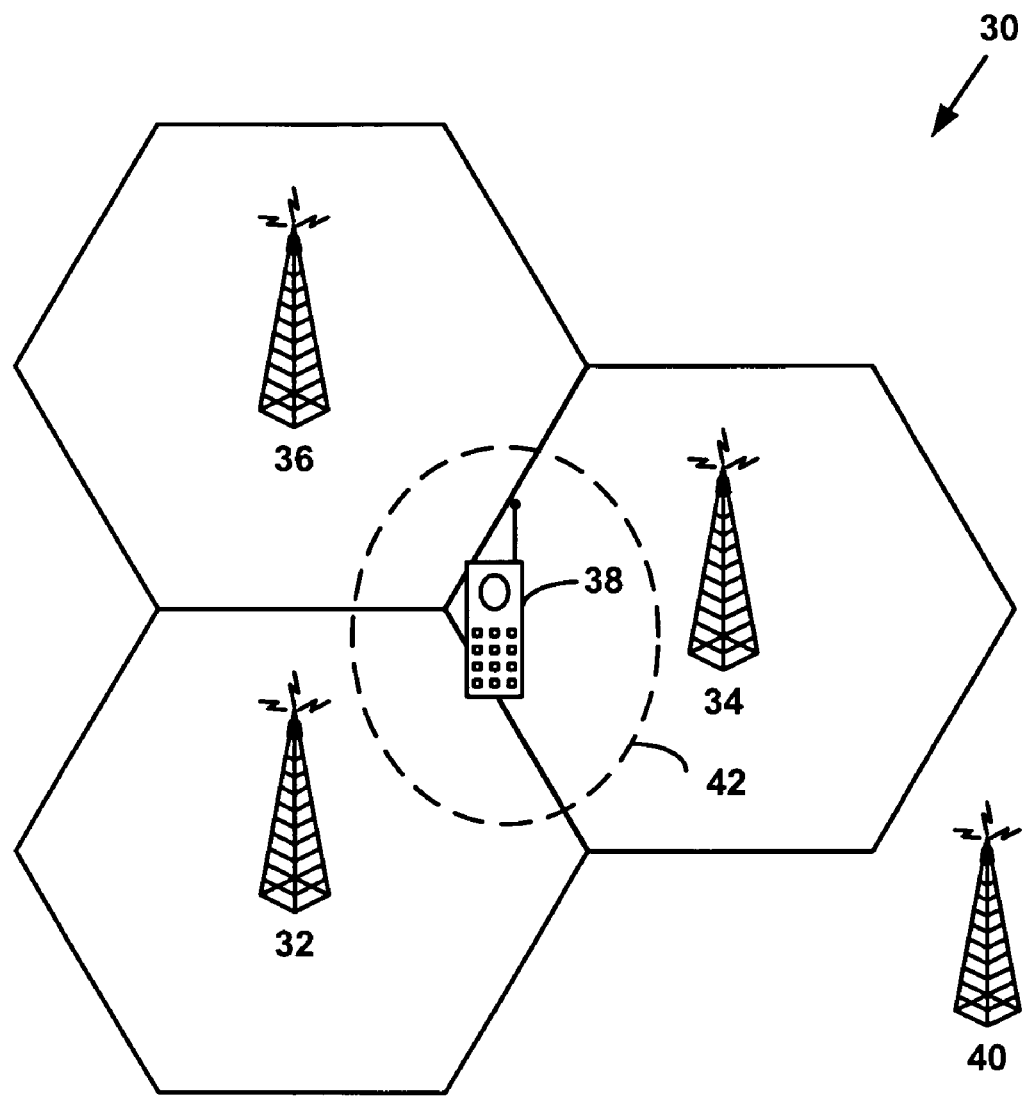
FIG. 2 is a block diagram illustrating an exemplary configuration of base stations in the cellular wireless system of FIG. 1.

FIG. 2 is a block diagram illustrating a configuration of base stations 30 in the cellular wireless system 10 of FIG. 1. The nearest neighbor base stations 32-36 to a mobile station 38 will transmit pilot signals to the mobile station 38. Each pilot signal includes a PN offset that identifies a sector of the base station to the mobile station 38. Typically, the pilot signal from the nearest sector of the nearest base station 34 dominates and the mobile station 38 locks onto the nearest base station 34. When locked onto a particular base station 32, 34, or 36, the mobile station 38 provides the BSC 16 with the PN offset of the dominant sector of the dominant base station 34. Consequently, the BSC 16 routes communications to/from the PSTN 20 through the dominant base station 34 from/to the mobile station 38.

As the mobile station 38 moves within the geographical region of the cells and sectors, the relative strengths of the pilot signals at the mobile station 38 will change depending on the proximity of the mobile station 38 to each base station 32-36. Other RF propagation variables, such as intervening buildings or topography, may influence the measured strengths of the pilot signals. When another pilot signal dominates, the mobile station 38 alerts the BSC 16, which in turn instructs the base stations 32-36 to hand off the mobile station 38 to the sector of the base station 3236 with the newly dominant pilot signal. The mobile station 38 continues communicating with the PSTN 20 through the base station 32-36 having the sector that has the newly dominant pilot signal.

Pilot pollution occurs when, within a geographical area 42, a pilot signal that is not from a nearest neighbor base station 32-36 is of similar or greater strength to the pilot signals from the nearest neighbor base stations 32-36. For example, the farther base station 40 illustrated in FIG. 2 may transmit a pilot signal whose signal strength is similar to the pilot signal from the nearest sector of the nearest base station 34. The mobile station 38 may lock onto the farther base station 40 in lieu of locking onto the nearest base station 34. As the mobile station 38 moves through the geographical area 42, the BSC 16 may attempt to hand the mobile station 38 off to a neighboring sector of the farther base station 40. As the mobile station 38 is not near to the farther base station 40 and some of its neighboring sectors, the mobile station 38 may not be able to establish communication after the hand-off and so may be dropped from the cellular wireless system 10.

Figure 3:
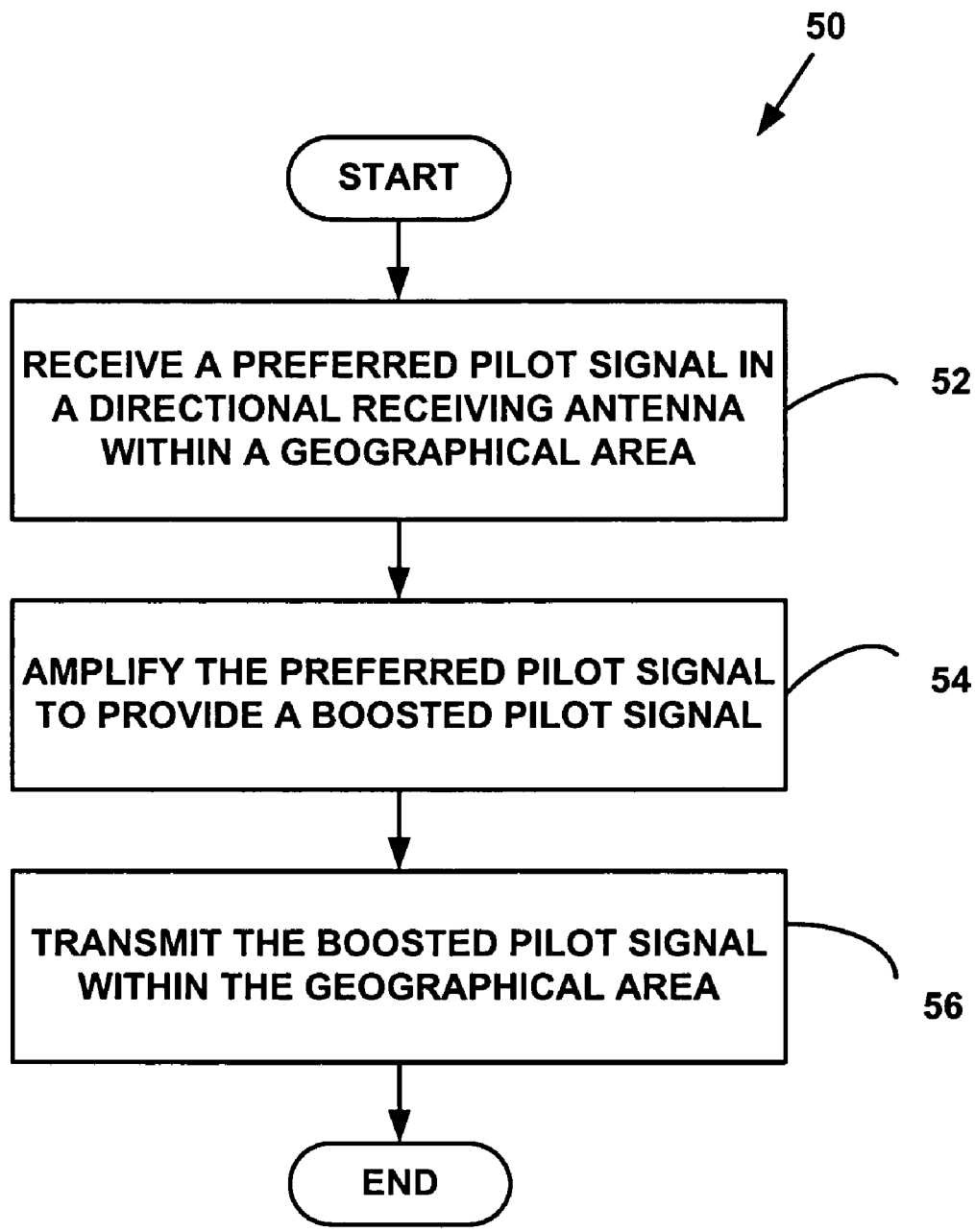
FIG. 3 is a block diagram illustrating a preferred method for overcoming pilot pollution in the cellular wireless system of FIG. 1.

FIG. 3 is a flow diagram illustrating a preferred method 50 for overcoming pilot pollution in a geographical area 42 within the cellular wireless system 10 of FIG. 1. The method 50 includes receiving a preferred pilot signal in a directional receiving antenna within the geographical area 42 from a selected base station 34 at step 52. At step 54, the method 50 includes amplifying the preferred pilot signal to provide a boosted pilot signal. The method 50 also includes transmitting the boosted pilot signal within the geographical area 42 at step 56.

Figure 4:
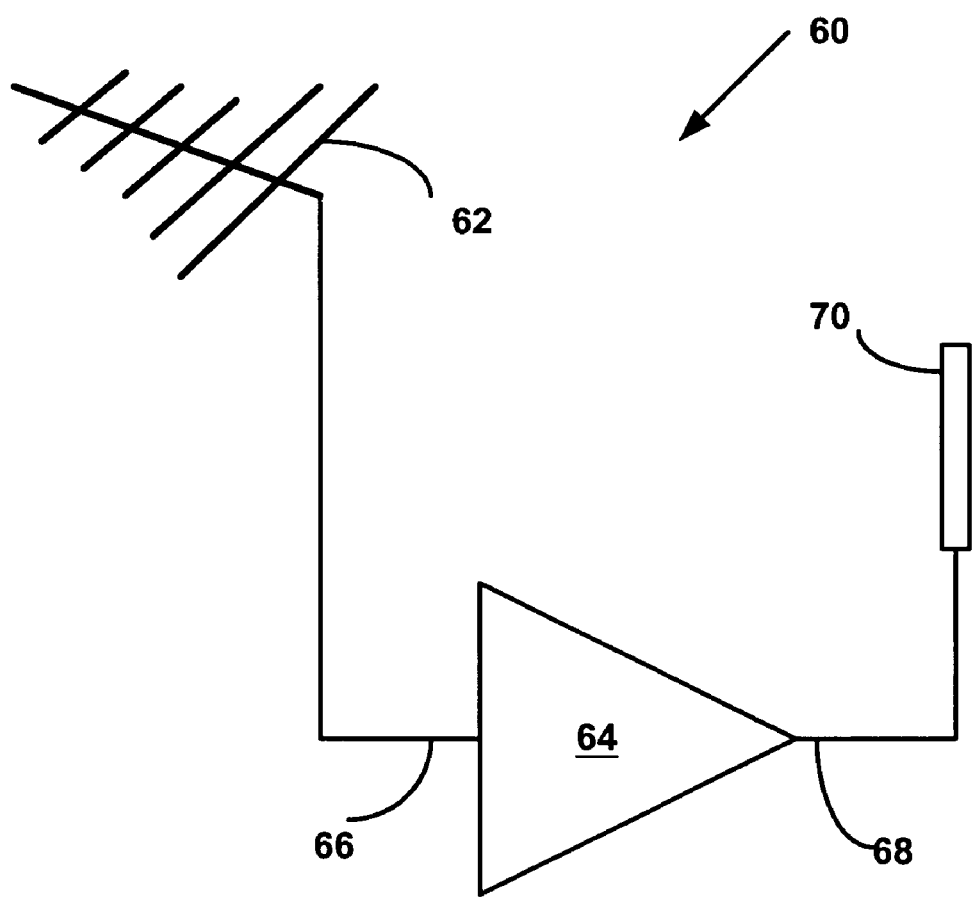
FIG. 4 is a block diagram illustrating a preferred apparatus for overcoming pilot pollution in the cellular wireless system of FIG. 1.

FIG. 4 is a block diagram illustrating a preferred apparatus 60 for overcoming pilot pollution in the geographical area 42 within the cellular wireless system 10 of FIG. 1. The apparatus 60 includes a directional receiving antenna 62 for receiving a preferred pilot signal from a selected base station 34. The apparatus 60 also includes a radio-frequency amplifier 64 FS having an input 66 and an output 68. The input 66 accepts the preferred pilot signal from the directional receiving antenna 62 and the output 68 provides a boosted pilot signal. The apparatus 60 further includes a transmission antenna 70 that accepts the boosted pilot signal from the output 68 of the radio-frequency amplifier 64 and transmits the boosted pilot signal within the geographical area 42.

In one configuration, the directional receiving antenna 62 is aligned towards the selected base station 34 that transmits the preferred pilot signal. The directional receiving antenna 62 preferentially receives the preferred pilot signal, which is boosted by the radio-frequency amplifier 64 and transmitted by the transmission antenna 70 in the geographical region 42. In this manner, the preferred pilot signal dominates over polluting pilot signals, forcing the mobile station 38 to lock onto the preferred pilot signal in the geographical area 42 and reject the polluting pilot signal in the geographical area 42.

Figure 5:
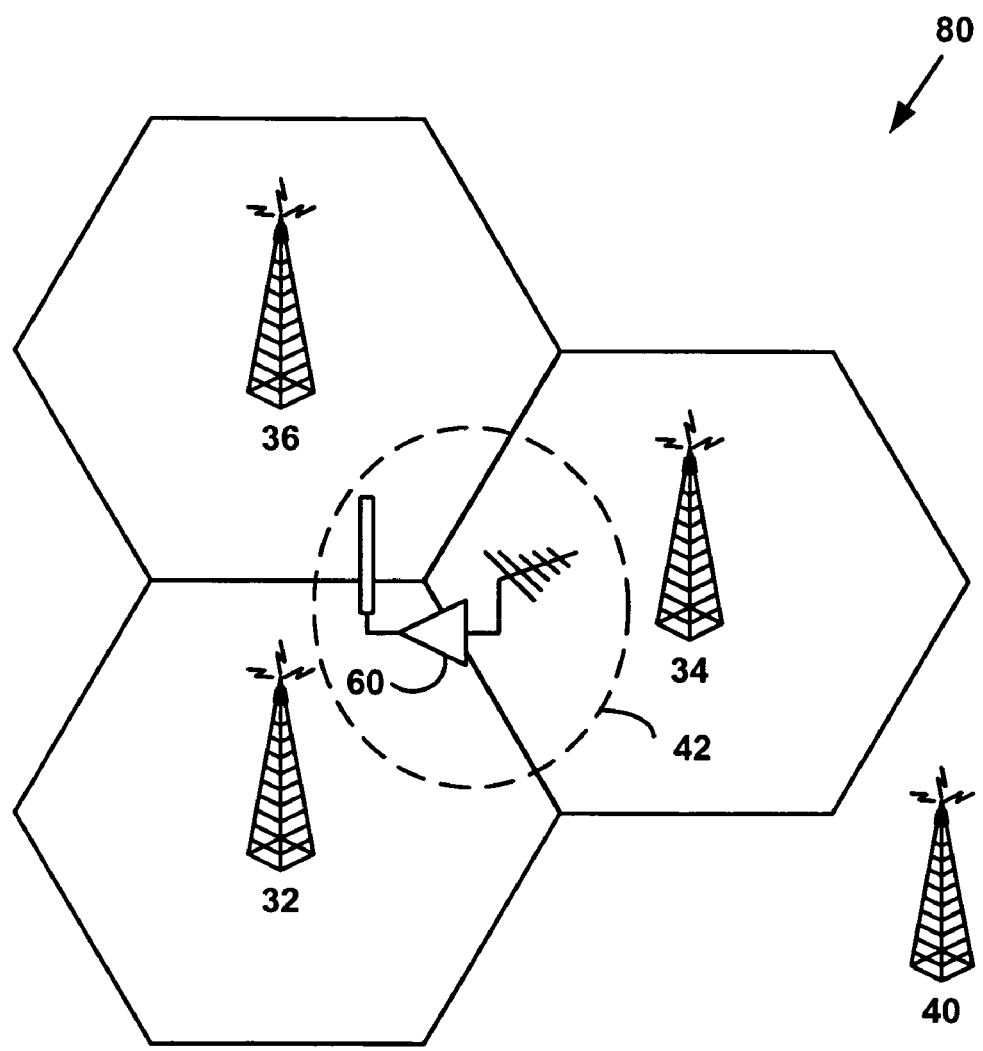
FIG. 5 is a block diagram illustrating an exemplary placement of the apparatus of FIG. 4 to overcome pilot pollution in the configuration of FIG. 2.

In the exemplary configuration of FIG. 2, the pilot signal from the farther base station 40 pollutes the geographical area 42, which is near the midpoint of the nearest base stations 32-36, causing the mobile station 38 to preferentially hand off to the farther base station 40 rather than to the nearest sector of the nearest base station 34. FIG. 5 is a block diagram illustrating an exemplary placement 80 of the apparatus 60 to overcome pilot pollution in the configuration 30 of FIG. 2. The apparatus 60 is placed in the geographical area 42 that suffers from pilot pollution. The directional receiving antenna 62 of the apparatus 60 is aligned with the selected nearest base station 34 that transmits the preferred pilot signal for the geographical area 42. The apparatus 60 receives and boosts the preferred pilot signal, and transmits this signal in the geographical area 42 from the transmission antenna 70. The strength of the boosted pilot signal may be adjusted to dominate over the polluting pilot signal from the farther base station 40, forcing the mobile station 38 to lock onto the preferred pilot signal from the selected base station 34, and not lock onto the polluting pilot signal. In this manner, the mobile station 38 may hand off to an appropriate neighboring sector when leaving the geographical area 42 instead of handing off to a neighboring sector of the farther base station 40, which may result in a dropped call.

In a preferred embodiment, the directional receiving antenna 62 is a Yagi antenna, familiar to those of ordinary skill in the art. The Yagi antenna, also called a Yagi-Uda array in the art, typically comprises a dipole, a reflector element, and one or more director elements. It should be understood, however, that other types of directional antennas may be used, such as a parabolic antenna or a phased array antenna, and the invention is not restricted to the Yagi antenna.

In another preferred embodiment, the RF amplifier 64 includes a Surface Amplitude Wave ("SAW") filter (not shown) to selectively amplify the preferred pilot signal. As is known to those of ordinary skill in the art, a SAW filter is a piezoelectric circuit device that passes RF signals within a very narrow frequency range. The center frequency of the range may also be determined to a high level of accuracy. The SAW filter amplifies the preferred pilot signal from the selected base station 34 and rejects other RF signals that are not within the spread spectrum of the CDMA cellular wireless system 10 of FIG. 1.

The transmitting antenna 70 transmits the boosted pilot signal within the geographical area 42. In one embodiment, the transmitting antenna 70 is omni-directional. The transmitting antenna 70 may transmit in all directions from a position in the geographical area 42 that suffers substantially the most pilot pollution. In this manner, the boosted pilot signal from the preferred base station 34 may dominate the polluting pilot signal within the geographical area 42 and the mobile station 38 locks onto the pilot signal from the preferred base station 34 substantially independent of from which direction it enters the geographical area 42.

Alternatively, in another embodiment, the transmitting antenna 70 is directional. The transmitting antenna 70 may transmit in a preferred direction from within the geographical area 42. The pilot pollution may be caused by an intervening building or structure that partially or totally blocks the preferred pilot signal from the selected base station 34 within the geographical area 42. The directional transmitting antenna may compensate for the decreased signal strength in the RF shadow of the building or structure by transmitting the boosted pilot signal in the direction of the RF shadow. In this manner, the boosted pilot signal from the selected base station 34 may dominate the polluting pilot signal within the whole geographical area 42 and the mobile station 38 locks onto the pilot signal from the selected base station 34 substantially independent of from which direction it enters the geographical area 42 or whether it is in the RF shadow of the building or structure.

Forcing a Hand-Off on Crossing a Boundary

Figure 6:
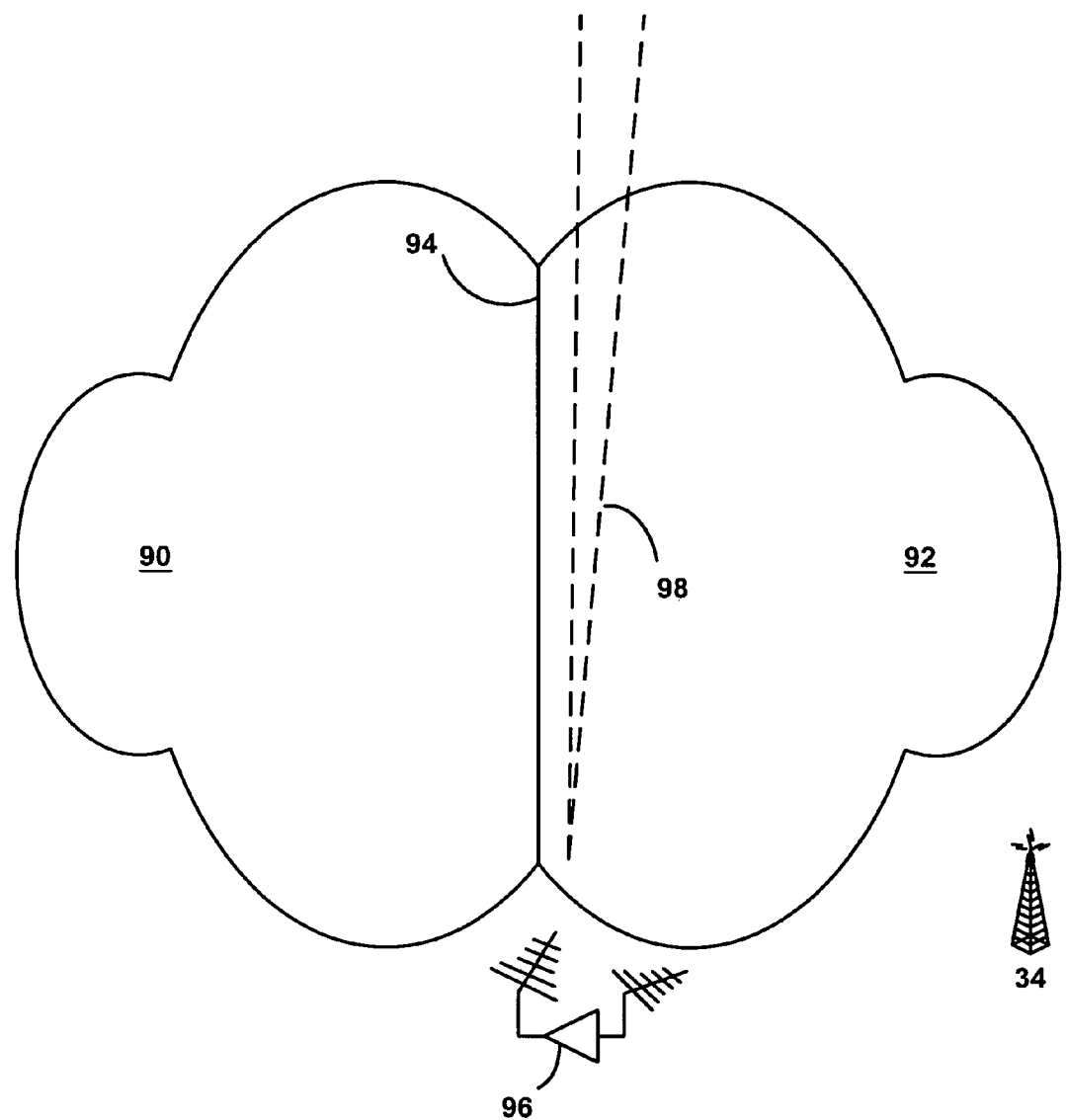
FIG. 6 is a block diagram illustrating exemplary first and second geographical areas separated by a boundary.

FIG. 6 is a block diagram illustrating a first geographical area 90 and a second geographical area 92 separated by a boundary 94. For example, the first geographical area 90 may include a facility, a workplace, or a business that hosts a private wireless network, and the second geographical area 92 may be part of a publicly accessible cellular wireless network. Within the facility in the first geographical area 90, a mobile station 38 may preferentially lock onto the private wireless network and receive information or advertising that is pushed from the private wireless network to the mobile station 38. Additionally, the private wireless network may exact fees from the operator of the publicly accessible cellular wireless network or the user of the mobile station 38 for connecting the mobile station 38 through the private wireless network to the cellular wireless network when the mobile station 38 is within the first geographical area 90.

But when the mobile station 38 leaves the first geographical area 90 by crossing the boundary 94 into the second geographical area 92, the mobile station 38 may need to be forced to hand-off to the base station 34 that serves the second geographical area 92. An apparatus 96 that transmits a boosted pilot signal for the base station 34 within a narrow radiation beam 98 along the boundary 94 would force the mobile station 38 to lock onto the boosted pilot signal after crossing the boundary 94 into the second geographical area 92.

Figure 7:
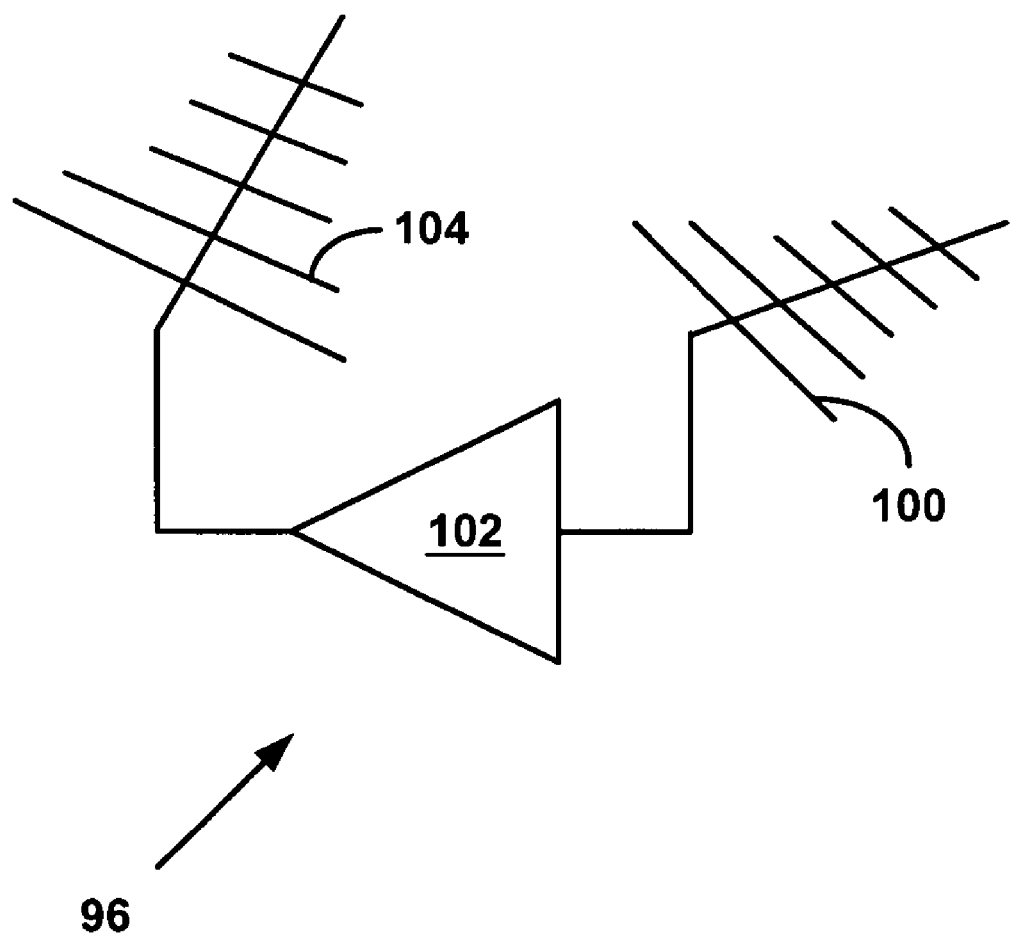
FIG. 7 is a block diagram illustrating a preferred apparatus for forcing a hand-off within the cellular wireless system of FIG. 1 on crossing the boundary from the first geographical area to the second geographical area.

FIG. 7 is a block diagram illustrating a preferred apparatus 96 for forcing a hand-off within a cellular wireless system 10 after crossing a boundary 94 from a first geographical area 90 to a second geographical area 92. The apparatus 96 includes a directional receiving antenna 100 for receiving a preferred pilot signal from a selected base station 34. The apparatus 96 also includes a radio-frequency amplifier 102 having an input and an output. The input accepts the preferred pilot signal from the directional receiving antenna 100 and the output provides a boosted pilot signal. A directional transmission antenna 104 accepts the boosted pilot signal from the output of the radio-frequency amplifier 102 and transmits the boosted pilot signal within the second geographical area 92.

Both antennas 100, 104 may be Yagi antennas to selectively receive the preferred pilot signal from the selected base station 34, and to concentrate the transmission of the boosted pilot signal along the boundary 94. The RF amplifier 102 may also include a SAW filter (not shown) to reject RF signals that are not within the CDMA spread spectrum for the cellular wireless system 10. It should be understood, however, that the receiving 100 or transmitting 104 antenna may be another form of directional antenna, such a parabolic antenna or phased array antenna, and that the present invention is not restricted to Yagi antennas. Also, it should be understood that the RF amplifier 102 may or may not include a SAW filter, and may or may not include another form of high rejection frequency filter familiar to those of ordinary skill in the art.

FIG. 8 is a flow diagram illustrating a preferred method 110 for forcing a hand-off within a cellular wireless system 10 on crossing a boundary 94 from a first geographical area 90 to a second geographical area 96. The method includes receiving a preferred pilot signal in a directional receiving antenna 100 from a selected base station 34 at step 112. At step 114, the method 110 includes amplifying the preferred pilot signal to provide a boosted pilot signal, and also includes transmitting the boosted pilot signal within the second geographical area 92 from a directional transmitting antenna 104 at step 116.

In a preferred embodiment of the method 110, the directional transmitting antenna 104 is aligned to point along the direction of the boundary 94. The radiation beam 98 from the transmitting antenna 104 should preferably be within the second geographical area 92 as is illustrated in FIG. 6. The signal strength of the radiation beam 98 from the directional transmitting antenna 104 typically falls off at angular deviations from the central axis of the radiation beam 98, as is familiar to those of ordinary skill in the art. The boosted signal strength may be adjusted, for example by adjusting the gain of the RF amplifier 102, to be substantially less than an intended pilot signal for the first geographical area 90. Within the first geographical area 90 the mobile station locks onto the intended pilot signal. In this manner, the mobile station 38 does not lock onto the boosted pilot signal until after it has crossed the boundary 94 from the first geographical area 90 into the second geographical area 92.

For example, the apparatus 96 may be placed at the exit to a facility with the directional transmitting antenna 104 aligned parallel to the exit, and with the directional receiving antenna 100 aligned with the selected base station 34. As mobile stations 38 exit the facility, the apparatus 96 may force the mobile stations 38 to hand off to the public cellular wireless network 10. Similarly, placing another apparatus 96 at an entrance to the facility, and with the directional transmitting antenna 104 aligned parallel to the entrance within the facility, may force mobile stations 38 to hand off to the facility's private wireless network when entering the facility. In this latter situation, the receiving antenna 100 may be aligned with a base station for the private wireless network within the facility, or alternatively the apparatus 96 may be connected directly to the facility's private wireless network, thus obviating the need for the directional receiving antenna 100.

In view of the wide variety of embodiments to which the principles of the invention can be applied, it should be understood that the illustrated embodiments are exemplary only, and should not be taken as limiting the scope of the present invention. For example, the steps of the flow diagrams may be taken in sequences other than those described, and more or fewer elements or components may be used in the block diagrams.

We claim:

1. A method for forcing a hand-off within a cellular wireless system on crossing a boundary from a first geographical area to a second geographical area, the method comprising:
   receiving a preferred pilot signal in a directional receiving antenna from a selected base station antenna that provides wireless coverage in the second geographical area;
   amplifying the preferred pilot signal to provide a boosted pilot signal;
   aligning a directional transmitting antenna to selectively transmit the boosted pilot signal within the second geographical area; and
   transmitting the boosted pilot signal within the second geographical area and substantially only along a boundary between the first and second geographical areas from the directional transmitting antenna, such that the boosted pilot signal has a signal strength within the first geographical area that is substantially less than an intended pilot signal for the first geographical area.

2. The method of claim 1 further comprising:
   aligning the directional receiving antenna with the selected base station in the cellular wireless network to selectively receive the preferred pilot signal, wherein the selected base station transmits the preferred pilot signal.

3. The method of claim 1 wherein the amplifying step comprises:
   selectively amplifying the preferred pilot signal with a surface acoustic wave filter.

4. An apparatus for forcing a hand-off within a cellular wireless system on crossing a boundary from a first geographical area to a second geographical area comprising:
   a directional receiving antenna for receiving a preferred pilot signal from a selected base station antenna that provides wireless coverage in the second geographical area;
   a radio-frequency amplifier having an input and an output, wherein the input accepts the preferred pilot signal from the directional receiving antenna and the output provides a boosted pilot signal; and
   a directional transmission antenna that accepts the boosted pilot signal from the output of the radio-frequency amplifier and transmits the boosted pilot signal within the second geographical area, wherein the directional transmission antenna is aligned to transmit the boosted pilot signal substantially only along a boundary between the first and second geographical areas, such that the boosted pilot signal has a signal strength within the first geographical area that is substantially less than an intended pilot signal for the first geographical area.

5. The apparatus of claim 4 wherein the directional receiving antenna is a Yagi antenna.

6. The apparatus of claim 4 wherein the directional transmitting antenna is a Yagi antenna.

7. The apparatus of claim 4 wherein the radio-frequency amplifier includes a surface amplitude wave filter to selectively amplify the preferred pilot signal.

8. A method for forcing a hand-off within a cellular wireless system on crossing a boundary from a first geographical area to a second geographical area, the method comprising:
   aligning a directional receiving antenna with a selected base station antenna that provides wireless coverage in the second geographical area in the cellular wireless network to selectively receive a preferred pilot signal, wherein the selected base station transmits the preferred pilot signal;
   receiving the preferred pilot signal in the directional receiving antenna from the selected base station;
   selectively amplifying the preferred pilot signal with a surface acoustic wave filter to provide a boosted pilot signal;
   aligning a directional transmitting antenna to selectively transmit the boosted pilot signal within the second geographical area; and adjusting the boosted pilot signal to have a signal strength within the first geographical area that is substantially less than an intended pilot signal for the first geographical area; and transmitting the boosted pilot signal within the second geographical area and substantially only along a boundary between the first and second geographical areas from the directional transmitting antenna.

9. An apparatus for forcing a hand-off within a cellular wireless system on crossing a boundary from a first geographical area to a second geographical area comprising:

a Yagi receiving antenna for receiving a preferred pilot signal from a selected base station antenna that provides wireless coverage in the second geographical area;

a radio-frequency amplifier having an input and an output, wherein the input accepts the preferred pilot signal from the Yagi receiving antenna and the output provides a boosted pilot signal, and wherein the radio-frequency amplifier includes a surface amplitude wave filter to selectively amplifier the preferred pilot signal; and a Yagi transmission antenna that accepts the boosted pilot signal from the output of the radio-frequency amplifier and transmits the boosted pilot signal within the second geographical area, wherein the Yagi transmission antenna is aligned to transmit the boosted pilot signal substantially only along a boundary between the first and second geographical areas, such that the boosted pilot signal has a signal strength within the first geographical area that is substantially less than an intended pilot signal for the first geographical area.

* * * * *